(12) United States Patent
Kumar et al.

(10) Patent No.: US 12,386,966 B2
(45) Date of Patent: Aug. 12, 2025

(54) FORCED UPGRADE FOR AIRGAPPED NETWORK MANAGEMENT SYSTEM

(71) Applicant: Hewlett Packard Enterprise Development LP, Spring, TX (US)

(72) Inventors: Sumit Kumar, Karnataka (IN); Gopal Gupta, Karnataka (IN); Peera Reddy Polaka, Karnataka (IN)

(73) Assignee: Hewlett Packard Enterprise Development LP, Spring, TX (US)

( * ) Notice: Subject to any disclaimer, the term of this patent is extended or adjusted under 35 U.S.C. 154(b) by 121 days.

(21) Appl. No.: 18/409,288

(22) Filed: Jan. 10, 2024

(65) Prior Publication Data
US 2025/0124134 A1 Apr. 17, 2025

(30) Foreign Application Priority Data
Oct. 13, 2023 (IN) .............................. 202341069135

(51) Int. Cl.
*G06F 9/455* (2018.01)
*G06F 8/65* (2018.01)
*G06F 21/53* (2013.01)
*G06F 21/57* (2013.01)

(52) U.S. Cl.
CPC .............. *G06F 21/572* (2013.01); *G06F 8/65* (2013.01); *G06F 2221/033* (2013.01)

(58) Field of Classification Search
None
See application file for complete search history.

(56) References Cited

U.S. PATENT DOCUMENTS

| | | | | |
|---|---|---|---|---|
| 2012/0079471 A1* | 3/2012 | Vidal | ........................ | G06F 8/65 717/169 |
| 2016/0371097 A1* | 12/2016 | Magee | ..................... | G06F 8/654 |
| 2018/0211036 A1* | 7/2018 | Zlotnik | .................... | H04L 63/02 |
| 2019/0303354 A1* | 10/2019 | Zamir | .................... | G06F 16/113 |
| 2020/0259855 A1* | 8/2020 | Inokuchi | .................. | G06F 21/57 |
| 2021/0226929 A1* | 7/2021 | Kiyanclar | ........... | H04L 63/0281 |

* cited by examiner

*Primary Examiner* — Christopher B Robinson
(74) *Attorney, Agent, or Firm* — Hewlett Packard Enterprise Patent Department

(57) ABSTRACT

A forced upgrade technique for airgapped network management system (NMS) deployments utilizes a package upgrade record. The package upgrade record includes metadata about a target major version of a software package for the NMS deployment, and is generated by an update server that is airgapped from the NMS deployment. A control server of the NMS deployment determines whether the package upgrade record has been provided to the control server. Access to a user interface of the control server is denied in response to the package upgrade record not having been provided to the control server within an upgrade check window, while access to the user interface of the control server is permitted in response to the package upgrade record having been provided to the control server. Additionally, the NMS deployment may be forced to upgrade the software package to the target major.

20 Claims, 6 Drawing Sheets

500

Receive a package upgrade record, the package upgrade record comprising metadata about minor versions of a target major version of a software package for a network management system deployment, the metadata comprising online stability scores and changes of the minor versions. 502

Recommend one of the minor versions of the target major version based on the online stability scores and the changes of the minor versions. 504

Receive a selection of a selected minor version of the minor versions. 506

Enable a forced upgrade notification for the selected minor version of the target major version of the software package. 508

*Figure 5*

FORCED UPGRADE FOR AIRGAPPED NETWORK MANAGEMENT SYSTEM

BACKGROUND

A network management system is used to maintain and secure a network. Specifically, a network management system allows for the management of network nodes. A network management system collects data from the network nodes and provides a central point of control for the network nodes. Additionally, a network management system may help identify network issues. Further yet, a network management system may be used to monitor network resources and security. A network management system may be used in a cloud management environment. In a cloud management environment, the network management system may be remotely administered from a public cloud. Upgrading of a network management system is a common administrative challenge in a cloud management environment.

BRIEF DESCRIPTION OF THE DRAWINGS

Aspects of the present disclosure are best understood from the following detailed description when read with the accompanying figures.

FIG. 5 is a diagram of a forced package upgrade method, according to some implementations.

Corresponding numerals and symbols in the different figures generally refer to corresponding parts unless otherwise indicated. The figures are drawn to clearly illustrate the relevant aspects of the disclosure and are not necessarily drawn to scale.

DETAILED DESCRIPTION

Figure 1:
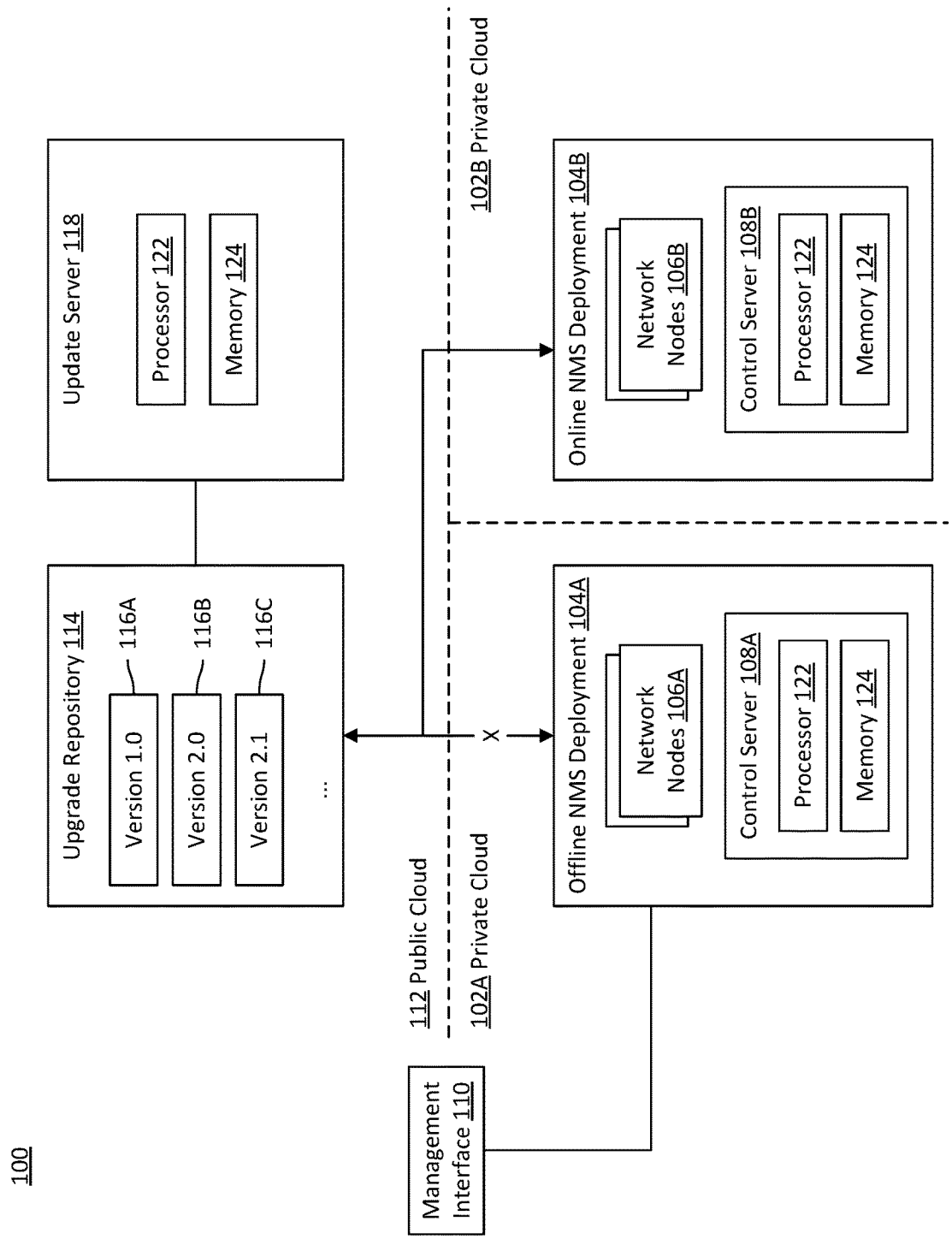
FIG. 1 is a diagram of a cloud management environment, according to some implementations.

The following disclosure provides many different examples for implementing different features. Specific examples of components and arrangements are described below to simplify the present disclosure. These are, of course, merely examples and are not intended to be limiting.

In a cloud management environment, a network management system (NMS) deployed at an on-premises private cloud may use the same software package as that used in a public cloud. To avoid a software package mismatch between the public cloud and the private cloud, periodic upgrade of the NMS deployed at the private cloud may be mandated using a forced upgrade mechanism. For example, when a new major version of a software package for the NMS is released, the NMS deployment may be forced to upgrade to the new major version within a certain timeline. Forcing upgrade of the NMS deployment helps avoid fragmentation of the cloud management environment. The maintainability, security, and stability of the NMS deployment may thus be improved.

The private cloud where an NMS is deployed may be airgapped (physically or logically) from the public cloud. Airgapping a private cloud may improve the security of the private cloud, such as by reducing the risk of unauthorized access to data stored in the private cloud. However, an airgapped NMS deployment may not be able to automatically check for and install forced upgrades, by nature of being offline and inaccessible to the public cloud. A timer-based upgrade cycle (where upgrades are periodically released on a known schedule) is a rudimentary way to force an airgapped NMS deployment to upgrade, however, timer-based upgrade cycles generally do not align with scheduled releases or support out-of-band upgrades (for, e.g., patches to security vulnerabilities). Additionally, timer-based upgrade cycles typically result in NMS deployments always being upgraded to the most recent minor version of a major version, regardless of whether that minor version is applicable to the NMS deployment.

The present disclosure describes a forced upgrade technique for airgapped NMS deployments that utilizes a package upgrade record. The package upgrade records are generated by an update server in the public cloud. An NMS deployment requires a package upgrade record be regularly provided to the NMS deployment. For example, an administrator of the NMS deployment may manually obtain the package upgrade record from the public cloud and then provide it to the NMS deployment in the private cloud. The package upgrade record indicates the most recent major version of a software package for the NMS deployment. By consuming the package upgrade record, an airgapped NMS deployment may effectively check whether a package upgrade is available, even when offline.

To enforce regular updates, an airgapped NMS deployment requires a new package upgrade record be regularly provided. The NMS deployment may permit access to a user interface of the NMS deployment if the package upgrade record is provided, but may deny access to the user interface of the NMS deployment if the package upgrade record is not provided within a particular window of time. By requiring the regular providing of package upgrade records, the NMS deployment may be forced to check for package upgrades even when it is airgapped. Upon determining that an upgrade is available, the NMS deployment may be forced to install that upgrade within a particular window of time.

In some implementations, the package upgrade record also indicates minor versions of the major version of the software package. One of the minor versions may be recommended for installation on the NMS deployment, based on the applicability of changes in a minor version to the NMS deployment. Thus, during a forced upgrade, an appropriate minor version of a major version may be installed on the NMS deployment.

FIG. 1 is a diagram of a cloud management environment 100, according to some implementations. The cloud management environment 100 is a system that includes multiple private clouds 102 (including a first private cloud 102A and a second private cloud 102B) and a public cloud 112. The public cloud 112 is a publicly accessible computer network operated by a cloud provider. The private clouds 102 are privately accessible computer networks operated by customers of the cloud provider. For example, the cloud management environment 100 may be a central on-premises environment, in which the public cloud 112 provides a central point of control for each private cloud 102, but customers' data is kept on-site at their respective private clouds 102.

The private clouds 102 include NMS deployments 104 (including a first NMS deployment 104A and a second NMS deployment 104B). In this example, the first NMS deployment 104A is deployed at the first private cloud 102A and the second NMS deployment 104B is deployed at the second private cloud 102B. The NMS deployments 104 include network nodes 106 (including first network nodes 106A and second network nodes 106B for, respectively, the first NMS deployment 104A and the second NMS deployment 104B), and further include control servers 108 (including a first control server 108A and a second control server 108B for, respectively, the first NMS deployment 104A and the second NMS deployment 104B).

The network nodes 106 may include network devices, host servers, and the like. The network devices may include controllers, access points, switches, routers, or the like. The host servers may be bare metal machines that host cloud components (e.g., virtual machines, containers, etc.), provide storage, or the like. The network devices of a private cloud 102 form a transport network that provides connectivity and routing between the host servers of the private cloud 102. The control servers 108 control the NMS deployments 104. An administrator of a private cloud 102 may access a control server 108 of the private cloud 102 and use it to control the NMS deployment 104 (e.g., the network nodes 106) of the private cloud 102. The control server 108 and the network nodes 106 of an NMS deployment 104 may each run software from a same version of a software package for the network management system.

A NMS deployment 104 may be managed via a user interface, such as a management interface 110. The control server 108 of the NMS deployment 104 may receive commands from the management interface 110 and display output with the management interface 110. The management interface 110 may be a command line interface, a graphical user interface, a web interface, or the like. The control server 108 may process the commands from the management interface 110, validate the commands, and execute logic specified by the commands. Further, the control server 108 may output the results of commands via the management interface 110. An administrator may access the control server 108 using the management interface 110.

The public cloud 112 includes components (e.g., a NMS control service, not separately illustrated) that control the NMS deployments 104. For example, the NMS control service of the public cloud 112 may be a central point of control, accessible by the administrators of the private clouds 102. An administrator of a private cloud 102 may access the public cloud 112 and use it to control the NMS deployment 104 (e.g., the network nodes 106) of the private cloud 102. The NMS control service may communicate with the control servers 108 of the private clouds 102 to control the NMS deployments 104.

The private clouds 102 and the public cloud 112 use the same software package for the network management system. For example, a software package may be deployed to the network nodes 106 of the private clouds 102 as well as to the components (e.g., NMS control service) of the public cloud 112. A software package may include software for the network nodes 106, such as software for the network devices, operating system(s) for the host servers, container(s) that will be hosted with the host servers, etc. To avoid a software package mismatch between the public cloud 112 and the private clouds 102, periodic upgrade of the NMS deployments 104 may be mandated. When a new major version of a software package is released, the NMS deployments 104 may be forced to upgrade to the new major version. As subsequently described in greater detail, the NMS deployments 104 (including airgapped NMS deployments 104) will be forced to check whether upgrades to the software package are available using package upgrade records generated by a server of the public cloud 112.

The public cloud 112 includes an upgrade repository 114, which may be used to store the versions of the software package. The upgrade repository 114 may be a suitable file store, key-value store, or the like. The upgrade repository 114 stores different versions 116 of a software package for a network management system. In this example, a first version 116A, a second version 116B, and a third version 116C of the software package are stored on the upgrade repository 114. The first version 116A is a first major version (e.g., "Version 1.0"). The second version 116B and the third version 116C are minor versions of a second major version (e.g., "Version 2.0" and "Version 2.1"). As subsequently described in greater detail, an NMS deployment 104 will be forced to upgrade to a new major version of a software package, but an administrator may choose which minor version of the major version should be installed. In this example, the NMS deployments 104 running the first version 116A of the software package will be forced to one of the second version 116B or the third version 116C of the software package, but which of these versions is used may be chosen by the administrator of each NMS deployment 104. Thus, each NMS deployment 104 may be forced to run a same major version of a software package. During an upgrade, the NMS deployments 104 may obtain the desired version of the software package from the upgrade repository 114.

The NMS deployments 104 may include offline NMS deployments (e.g., the first NMS deployment 104A) which are airgapped from the public cloud 112, as indicated by an "X" in FIG. 1. The airgapping of an offline NMS deployment 104A may be physical or logical. In physical airgapping, an offline NMS deployment 104A has no physical or logical connection to the public cloud 112. In logical airgapping, an offline NMS deployment 104A has a physical connection to the public cloud 112 but does not have a logical connection to the public cloud 112. A logical connection to the public cloud 112 may be programmatically enabled and disabled. For example, an offline NMS deployment 104A may be blocked from the public cloud 112 via firewall rule(s) during normal operation, but may be permitted to access the public cloud 112 by temporarily disabling the firewall rule(s) during a maintenance operation. The NMS deployments 104 may also include online NMS deployments (e.g., the second NMS deployment 104B). An online NMS deployment 104B may have a constant physical and logical connection to the public cloud 112.

The public cloud 112 further includes an update server 118. The update server 118 forces updating of the NMS deployments 104, including offline NMS deployments 104A and online NMS deployments 104B. Specifically, the update server 118 generates package upgrade records for the NMS deployments 104. Among other things, a package upgrade record indicates a target major version of the software package for the NMS deployments 104. A package upgrade record may be generated by the update server 118 and stored in the upgrade repository 114. The package upgrade records stored in the upgrade repository 114 may be provided to the NMS deployments 104. A package upgrade record may be customized to an NMS deployment 104.

The servers (e.g., the control servers 108 and/or the update server 118) may include any suitable components. Suitable components include a processor, an application-specific integrated circuit, a microcontroller, memory, and the like. Each server may be a physical computing device. For example, each server may include a processor 122 and a memory 124. The memory 124 may be a non-transitory computer readable medium storing instructions for execution by the processor 122. One or more modules within the control servers 108 and/or the update server 118 may be partially or wholly embodied as software and/or hardware for performing any functionality described herein.

As subsequently described in greater detail, an NMS deployment 104 requires a new package upgrade record be regularly provided in order to continue fully operating. An online NMS deployment 104B may directly obtain a package upgrade record from the upgrade repository 114 on an automatic and regular basis. An administrator of an offline NMS deployment 104A may regularly provide a package upgrade record to the offline NMS deployment 104A in several manners. For example, an administrator may manually provide a package upgrade record to an offline NMS deployment 104A (e.g., by uploading it via the management interface 110), may temporarily disable firewall rule(s) so the offline NMS deployment 104A may directly obtain a package upgrade record from the upgrade repository 114, or the like. In response to a new package upgrade record being provided, the NMS deployment 104 may resume fully operating for a particular amount of time before another new package upgrade record is required. Thus, an offline NMS deployment 104A may be forced to regularly check for a new major version of its software package, even when airgapped from the update server 118.

Figure 2:
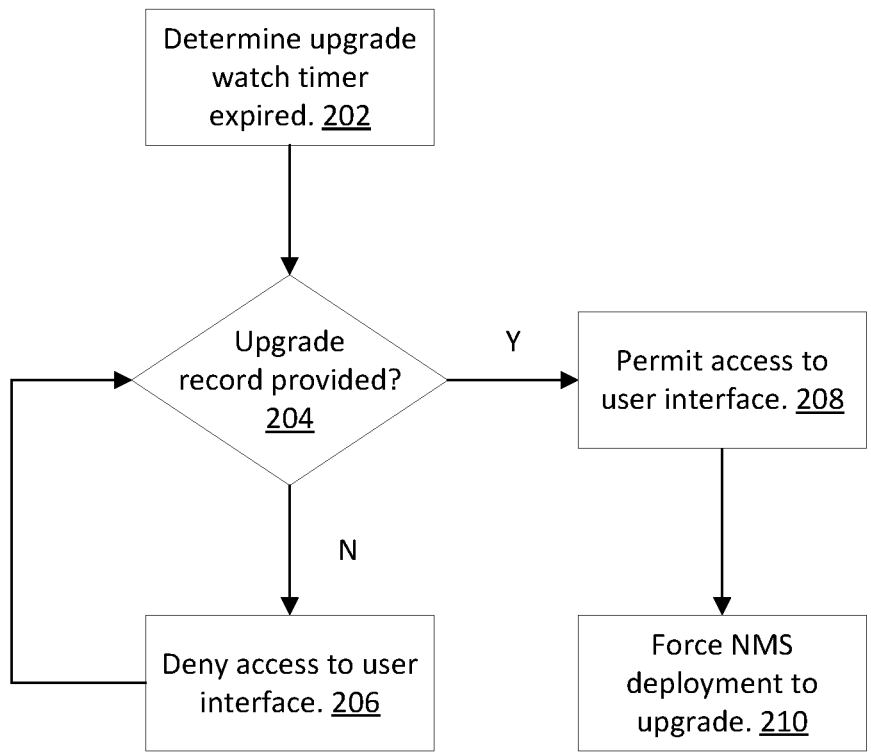
FIG. 2 is a diagram of a package upgrade check method, according to some implementations.

FIG. 2 is a diagram of a package upgrade check method 200, according to some implementations. The package upgrade check method 200 will be described in conjunction with FIG. 1. The package upgrade check method 200 may be performed by a control server 108A of an offline NMS deployment 104A when the offline NMS deployment 104A is forced to check for a new major version of its software package.

The control server 108A performs a step 202 of determining an upgrade watch timer has expired. The upgrade watch timer may be preconfigured to a particular amount of time, such as 30 days, which corresponds to an upgrade check window. The upgrade watch timer may be reset to the preconfigured value when a new package upgrade record is provided to the control server 108A. Thus, expiration of the upgrade watch timer means the control server 108A has not checked for updates within the upgrade check window. At that point, the control server 108A will require a new package upgrade record be provided before fully operating.

As described herein, a control server 108A not fully operating includes one or more feature(s) of the control server 108A being disabled to encourage the providing of a new package upgrade record. In this example implementation, access to a user interface of the control server 108A (e.g., via the management interface 110) will be denied. Other functionality of the control server 108A may also be denied, as an alternative to or in addition to the denial of access to the user interface.

As described herein, access to a user interface includes access to at least a portion of the user interface. For example, access to some portions of the user interface may be denied. Access to a portion of the user interface that is used to provide a package upgrade record and/or upload a new version of a software package may continue being permitted, e.g., may not be denied.

The control server 108A performs a step 204 of determining whether a package upgrade record has been provided to the control server 108A, in response to the upgrade watch timer expiring. The package upgrade record indicates a target major version of a software package for the offline NMS deployment 104A. The package upgrade record may have been provided to the control server 108A by an administrator of the offline NMS deployment 104A. In some implementations, the administrator may manually provide the package upgrade record to the control server 108A by uploading it to the management interface 110 from a portable data storage device (e.g., a flash drive), a file sharing protocol (e.g., SMB, FTP, etc.), or the like. In some implementations, the administrator may temporarily permit the control server 108A to access the upgrade repository 114 (e.g., by disabling a firewall rule), and then use the management interface 110 to instruct the control server 108A to retrieve the package upgrade record from the upgrade repository 114.

The control server 108A performs a step 206 of denying access to a user interface of the control server 108A (e.g., at the management interface 110), in response to the package upgrade record not having been provided to the control server 108A within the upgrade check window. Specifically, if the upgrade watch timer has expired and a package upgrade record has not been provided to the control server 108A, then access to the user interface of the control server 108A is denied. Access to the user interface of the control server 108A may continue being denied until the package upgrade record is provided to the control server 108A.

The control server 108A performs a step 208 of permitting access to the user interface of the control server 108A, in response to the package upgrade record having been provided to the control server 108A. Specifically, when a package upgrade record is provided to the control server 108A, the upgrade watch timer is reset, such that access to the user interface of the control server 108A is permitted. Access to the user interface of the control server 108A may continue being permitted until the upgrade watch timer expires (which indicates the upgrade check window has passed).

When a package upgrade record is provided to a control server 108 of an NMS deployment 104, the package upgrade record is processed to determine whether a new major version of a software package for the NMS deployment 104 is available. If a new major version of the software package is available, then the control server 108 may be forced to upgrade the software package to that new major version within a forced upgrade window. In such a case, the control server 108A performs a step 210 of forcing the NMS deployment 104 to upgrade its software package to the target major version (indicated by the package upgrade record).

As subsequently described in greater detail, the NMS deployments 104 may be classified with different criticality scores (e.g., levels of criticality), depending on the operational footprints of the NMS deployments 104. For example, an NMS deployment 104 for a customer with a small operational footprint (e.g., a retailer) may have a lower criticality score than an NMS deployment 104 for a customer with a large operational footprint (e.g., a hospital). The criticality scores may be computed by the update server 118 and stored at the upgrade repository 114. The length of an upgrade timeline for an NMS deployment 104 may depend on its criticality score. The NMS deployments 104 with a higher criticality score may be given a longer grace period before they are forced to upgrade than the NMS deployments 104 with a lower criticality score.

Figure 3:
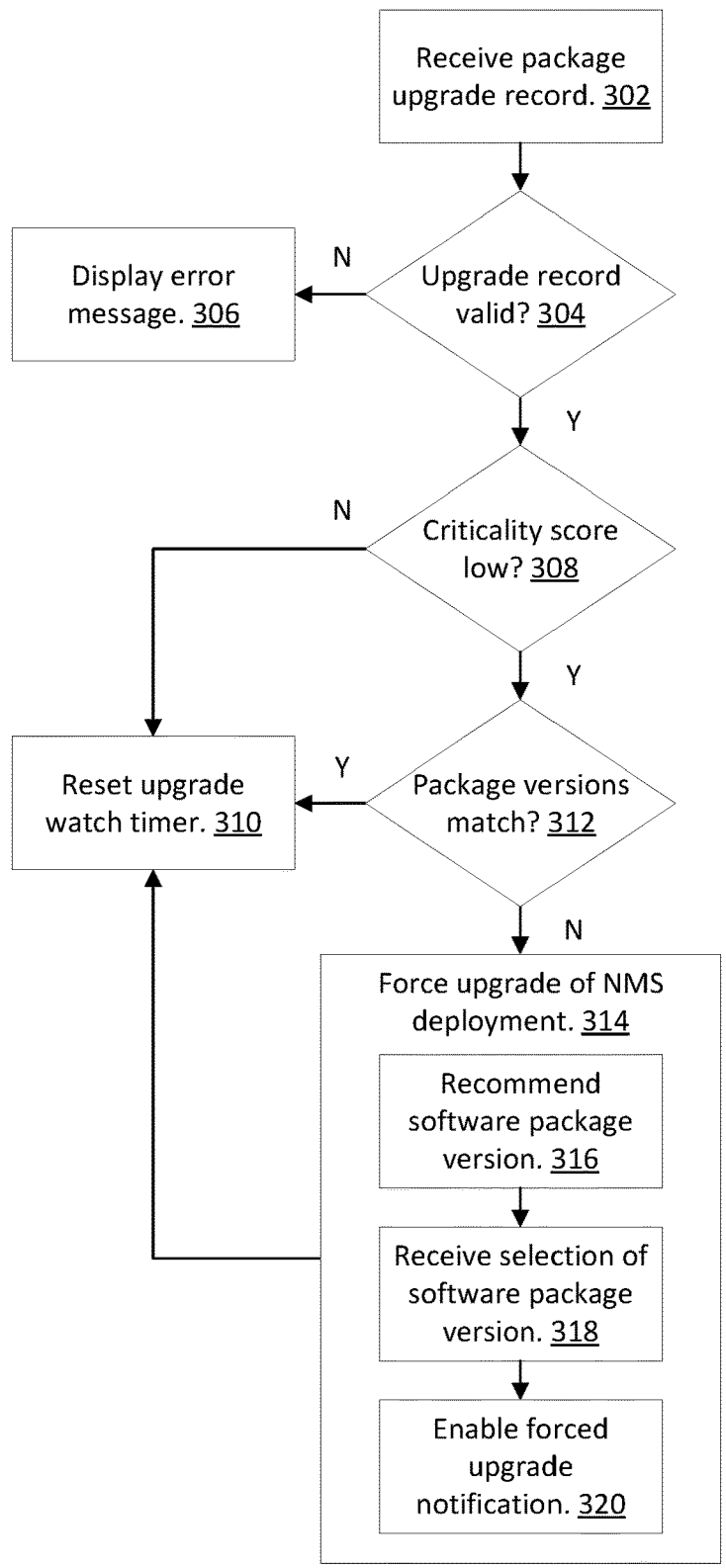
FIG. 3 is a diagram of a package upgrade record processing method, according to some implementations.

FIG. 3 is a diagram of a package upgrade record processing method 300, according to some implementations. The package upgrade record processing method 300 will be described in conjunction with FIG. 1. The package upgrade record processing method 300 may be performed by a control server 108A of an offline NMS deployment 104A, in response to the offline NMS deployment 104A being provided a package upgrade record.

The control server 108A performs a step 302 of receiving a package upgrade record. The package upgrade record may be received via the management interface 110, through which an administrator of the offline NMS deployment 104A has manually uploaded the package upgrade record. The package upgrade record may be received directly from the upgrade repository 114.

As previously noted, the package upgrade record indicates a target major version of a software package for the offline NMS deployment 104A. In some implementations, the package upgrade record also indicates minor versions of the major version of the software package. For example, the package upgrade record may include metadata about the target major version and metadata about the minor versions. The package upgrade record may also include a criticality score for the offline NMS deployment 104A. The package upgrade record further includes an upgrade threshold, which is a threshold against which the criticality score will be compared.

The package upgrade record may include a watcher file, which may be a text file. For example, the watcher file may include JavaScript Object Notation (JSON) data. The watcher file may include the upgrade threshold, metadata indicating the target major version of the software package for the offline NMS deployment 104A, metadata indicating the minor versions of the major version of the software package, and the like. Additionally, the watcher file may include a digital signature and/or a checksum.

Optionally, the package upgrade record may further include a customer profile file, which may be a text file. The customer profile file may include the criticality score for the offline NMS deployment 104A. Additionally, the customer profile file may include a digital signature and/or a checksum.

The control server 108A performs a step 304 of determining whether the package upgrade record is valid. For example, when the package upgrade record includes a watcher file with a digital signature and/or a checksum, the control server 108A may confirm the digital signature is valid and that the checksum of the watcher file matches an expected value. When the package upgrade record includes a customer profile file, that file may be similarly validated. Additionally, the contents of the package upgrade record may be validated. For example, the syntax and semantics of the customer profile file and/or the watcher file may be validated.

In some implementations, validating the package upgrade record includes confirm the package upgrade record is not outdated. For example, the control server 108A may keep a log of package upgrade records that are processed. The received package upgrade record may be compared to older package upgrade records, to confirm the received package upgrade record has not already been processed. In this manner, the control server 108A may avoid processing old package upgrade records and falsely believing it is up to date.

The control server 108A performs a step 306 of displaying an error message, in response to the package upgrade record being invalid. The error message may indicate the package upgrade record failed validation. The management interface 110 may be used to display the error message.

The control server 108A performs a step 308 of determining whether the criticality score for the offline NMS deployment 104A is sufficiently low. Specifically, the criticality score for the offline NMS deployment 104A is compared to the upgrade threshold (from the package upgrade record). If the criticality score is less than the upgrade threshold, then the criticality score is low enough to warrant forcing the offline NMS deployment 104A to upgrade its software package. However, if the criticality score is greater than the upgrade threshold, then the criticality score is high enough to warrant giving the offline NMS deployment 104A a longer grace period before it is forced to upgrade its software package.

In some implementations, the criticality score for the offline NMS deployment 104A is stored locally, e.g., in a memory of the control server 108A. Thus, the upgrade threshold (from the package upgrade record) may be compared to the locally stored criticality score. In some implementations, the criticality score for the offline NMS deployment 104A is also included in the package upgrade record. Thus, the upgrade threshold (from the package upgrade record) may be compared to the criticality score (from the package upgrade record). A combination of these techniques may be utilized. For example, the control server 108A may use a locally stored criticality score (if present), and may update the locally stored criticality score if one is provided with the package upgrade record.

The control server 108A performs a step 310 of resetting the upgrade watch timer, in response to the criticality score for the offline NMS deployment 104A being too high. An excessively high critical score indicates the offline NMS deployment 104A should be given a longer grace period before it is forced to upgrade its software package. When the criticality score is greater than the upgrade threshold, the upgrade watch timer may be reset without forcing the offline NMS deployment 104A to upgrade its software package at this time. Access to the user interface of the control server 108A may continue being permitted (e.g., in step 208 of FIG. 2).

The upgrade threshold, like the criticality score for the offline NMS deployment 104A, may be computed by the update server 118. The upgrade threshold may be dynamically recalculated by the update server 118 and increased over time for a particular major version. For example, the upgrade threshold included with the package upgrade record may initially be a low value, but the package upgrade record included with subsequently package upgrade records may be progressively increased. Thus, the offline NMS deployment 104A is eventually forced to upgrade, even when it has a higher criticality score. This has the effect of forcing the NMS deployments 104 with a lower criticality score to be forced into upgrading before the NMS deployments 104 with a higher criticality score.

The control server 108A performs a step 312 of determining whether the target major version of the software package (from the package upgrade record) matches the current major version of the software package for the offline NMS deployment 104A, in response to the criticality score for the offline NMS deployment 104A being sufficiently low. The current version of the software package for the offline NMS deployment 104A may be determined by the control server 108A. For example, if the target major version of the software package for the offline NMS deployment 104A is "2.5.4", then the current version being any minor version of that major version—such as "2.5.4.1", "2.5.4.2", etc.— would be considered a matching version. If the target major version of the software package matches the current major version of the software package for the offline NMS deployment 104A, then the control server 108A performs the step 310 (previously described) of resetting the upgrade watch timer.

The control server 108A performs a step 314 of forcing an upgrade of the offline NMS deployment 104A, in response to the target major version of the software package being mismatched with the current major version of the software package for the offline NMS deployment 104A. Specifically, the offline NMS deployment 104A is forced to upgrade to the target major version of the software package (from the package upgrade record). After the offline NMS deployment 104A is forced to upgrade, the control server 108A performs the step 310 (previously described) of resetting the upgrade watch timer. The process for forcing an upgrade of the offline NMS deployment 104A will be subsequently described.

The control server 108A performs a step 316 of recommending one of the minor versions of the target major version of the software package. The recommendation may be displayed via the management interface 110. During the forced upgrade, the administrator for the offline NMS deployment 104A is forced to select a new major version of the software package, but may be free to choose which minor version of the major version should be installed. For example, an NMS deployment 104 running software package Version 1.0 may be forced to upgrade to either Version 2.0 or Version 2.1, but the administrator is free to select which of those two minor versions should be used.

A recommended minor version may be chosen by the control server 108A. The minor version may be recommended based on a known installation history of the available minor versions. For example, if there are two minor versions available for selection, the minor version having a greater quantity of successful installations on other NMS deployments 104 may be recommended. Alternatively or additionally, a minor version may be recommended if the nature of the changes in the minor version are applicable to the offline NMS deployment 104A. For example, if a new minor version includes a fix for a component that is enabled or used in the offline NMS deployment 104A, then the minor version having that fix may be the recommended version.

As previously noted, the package upgrade record may indicate minor versions of the target major version of the software package. Specifically, the package upgrade record may include metadata about the available minor versions. In some implementations, the metadata includes an online stability score for each minor version, which is computed by the update server 118 based on feedback for installations of the minor versions on other NMS deployments 104. In some implementations, the metadata includes the nature of changes (e.g., bug fixes, applicable network nodes, impacted services, etc.) for each minor version.

The control server 108A performs a step 318 of receiving a selection of a minor version of the software package for the upgrade of the offline NMS deployment 104A. The selection may be received via the management interface 110. The selected minor version may be the one recommended to the administrator for the offline NMS deployment 104A, or may be another version selected by the administrator for the offline NMS deployment 104A. Continuing the previous example, the selected minor version may be Version 2.0 or Version 2.1, as either of those are acceptable minor versions of a new major version, but the selected software package version may not be Version 1.0, as that is an old major version.

The control server 108A performs a step 320 of enabling a forced upgrade notification for the selected minor version of the software package. When the forced upgrade notification is enabled, an administrator for the offline NMS deployment 104A may be informed via the management interface 110 that an upgrade of the offline NMS deployment 104A is mandated within a forced upgrade window. For example, upon accessing the management interface 110, a notification is displayed, notifying the administrator that an upgrade to the selected minor version of the target major version is mandated within the forced upgrade window.

Upon enabling the forced upgrade notification, the offline NMS deployment 104A may be forced to upgrade in a manner that is similar to how the offline NMS deployment 104A was forced to check for updates. For example, the control server 108A may permit access to the user interface of the control server 108A if the offline NMS deployment 104A is upgraded, but may deny access to the user interface of the control server 108A if the offline NMS deployment 104A is not upgraded within the forced upgrade window.

An administrator may upgrade the offline NMS deployment 104A by providing the selected version of the software package. The software package may be provided to the control server 108A by the administrator of the offline NMS deployment 104A during a maintenance window for the offline NMS deployment 104A. In some implementations, the administrator may manually provide the software package to the control server 108A by uploading it to the management interface 110 from a portable data storage device (e.g., a flash drive), a file sharing protocol (e.g., SMB, FTP, etc.), or the like. In some implementations, the administrator may temporarily permit the control server 108A to access the upgrade repository 114 (e.g., by disabling a firewall rule), and then use the management interface 110 to instruct the control server 108A to retrieve the software package from the upgrade repository 114. Upon completion of the upgrade, the forced upgrade notification may be disabled.

Figure 4:
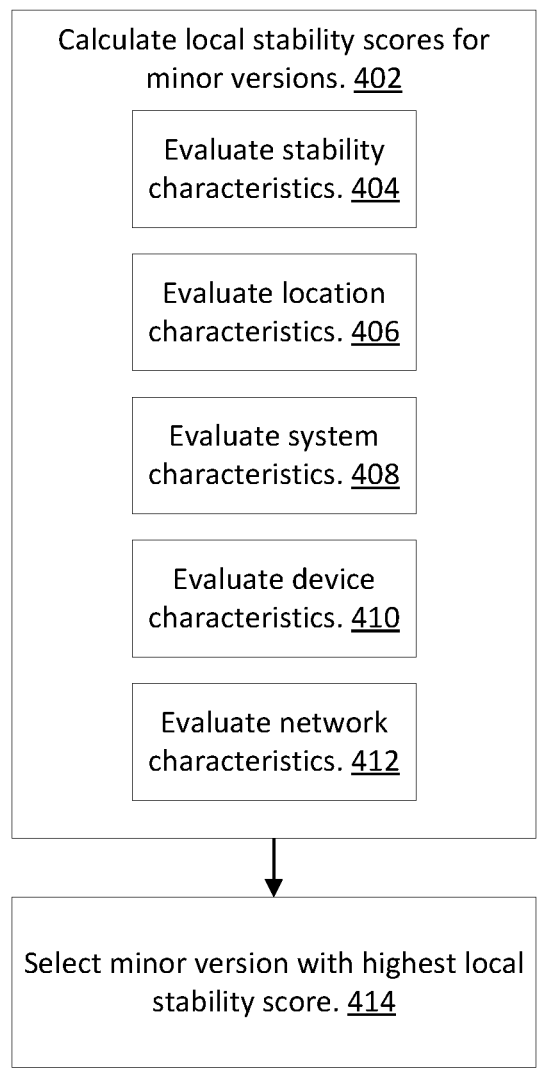
FIG. 4 is a diagram of a minor version recommendation method, according to some implementations.

FIG. 4 is a diagram of a minor version recommendation method 400, according to some implementations. The minor version recommendation method 400 will be described in conjunction with FIG. 1. The minor version recommendation method 400 may be performed by a control server 108A of an offline NMS deployment 104A when recommending a minor version of a software package during step 316 (see FIG. 3). As previously noted, a package upgrade record may include metadata about the available minor versions for a target major version of a software package. That metadata may be processed, using the minor version recommendation method 400, to recommend a minor version to an administrator.

The control server 108A performs a step 402 of calculating local stability scores for the available minor versions (from the package upgrade record). The local stability scores are particular to the offline NMS deployment 104A. The local stability scores are calculated based on the metadata about the available minor versions, including the online stability scores of the available minor versions, as well as the applicability of changes in the available minor versions. The local stability scores indicate the predicted stability of the available minor versions on the offline NMS deployment 104A. Performing the prediction includes correlating the changes in each minor version to the current state of the offline NMS deployment 104A, to predict which minor version will be the most stable minor version for the offline NMS deployment 104A. Additionally, the prediction includes an evaluation of the installation histories of the available minor versions on other NMS deployments 104.

The local stability scores are calculated by evaluating version characteristics of the available minor versions. The version characteristics include metadata about the available minor versions as well as metadata about the offline NMS deployment 104A. In an implementation, the characteristics include stability characteristics of the available minor versions, location characteristics of the offline NMS deployment 104A, system characteristics of the offline NMS deployment 104A, device characteristics of the offline NMS deployment 104A, network characteristics of the offline NMS deployment 104A, combinations thereof, and the like.

The version characteristics may be evaluated with a suitable weighted sum algorithm. The weighted sum algorithm assigns scores to the minor versions by computing a weighted sum of the version characteristics. Optionally, the version characteristics may be normalized to a standard scaler before they are evaluated. The normalization may be by a Z-score, percentile score, mathematical variant, or the like.

In some implementations, the control server 108A performs a step 404 of evaluating stability characteristics of the available minor versions. The stability characteristics are metadata values that represent the reported stability of the minor versions, as experienced by other NMS deployments 104. The stability characteristics are computed periodically (by the update server 118) based on the quantity of successful installations of each available minor version on other NMS deployments 104, the bug count history of each available minor version, the popularity of each available minor version, the crash rate of each minor version, security metrics of the available minor versions, and the like. Alternatively or additionally, the stability characteristics may include the scale, performance, security, functionality, longevity, usability, compatibility, and the like of the available minor versions. The update server 118 may collect telemetry data from the NMS deployments 104, compute online stability scores based on the telemetry data, and then assign those scores to the available minor versions. The minor versions with better stability characteristics (e.g., higher online stability scores) may have higher local stability scores.

In some implementations, the control server 108A performs a step 406 of evaluating location characteristics of the offline NMS deployment 104A. The location characteristics are metadata values that represent the geographic location of the offline NMS deployment 104A. High priority locations may be physical locations that are prone to hacking attacks. The package upgrade record may indicate that certain available minor versions include changes related to security at high priority locations. The minor versions with such changes may have higher local stability scores.

In some implementations, the control server 108A performs a step 408 of evaluating system characteristics of the offline NMS deployment 104A. The system characteristics are metadata values that represent how the offline NMS deployment 104A is deployed and configured. The system characteristics may include the status of critical applications of the offline NMS deployment 104A (e.g., license expiration status, certificate expiration dates, presence of known security vulnerabilities, etc.); security hardening parameters; feature subscriptions (e.g., which features of the offline NMS deployment 104A are enabled); the software, configurations, average load, and scale of the offline NMS deployment 104A; the types of licenses activated at the offline NMS deployment 104A (e.g., evaluation versus paid or premium licenses); cluster size of the offline NMS deployment 104A (indicating the sizes of the network nodes 106); and the like. Alternatively or additionally, the system characteristics may include the services running on the offline NMS deployment 104A, such as the state of services, security metrics of the services, and the like. The package upgrade record may indicate that certain available minor versions include changes that are applicable to the system characteristics of the offline NMS deployment 104A. The minor versions with such changes may have higher local stability scores.

In some implementations, the control server 108A performs a step 410 of evaluating device characteristics of the offline NMS deployment 104A. The device characteristics are metadata values that represent the network devices of the offline NMS deployment 104A. The device characteristics may include the number and type of network devices fingerprinting in the offline NMS deployment 104A, such as particular types of access points, switches, controllers, etc. Alternatively or additionally, the device characteristics may include the services that are running on the network devices of the offline NMS deployment 104A, such as device management services, user interface services, infrastructure-related services, host-related services, and the like. The package upgrade record may indicate that certain available minor versions include changes that are applicable to the device characteristics of the offline NMS deployment 104A. The minor versions with such changes may have higher local stability scores.

In some implementations, the control server 108A performs a step 412 of evaluating network characteristics of the offline NMS deployment 104A. The network characteristics are metadata values that represent the network connections within the offline NMS deployment 104A. The network connections within the offline NMS deployment 104A may include LAN connections, WAN connections, MAN connections, etc. For example, customers in education may have a large quantity of floating users and devices with device-based authentication; customers in healthcare may have sensitive data and networks; customers in retail may have many digital transformations and IoT devices; customers in enterprise entities may have many VPN tunnels and large application-aware firewall traffic that is based on access control lists and/or role-based access control; while customers in air transportation may have connections that are sensitive and transient. The package upgrade record may indicate that certain available minor versions include changes that are applicable to the network connections of the offline NMS deployment 104A. The minor versions with such changes may have higher local stability scores.

Other version characteristics may also be evaluated. For example, a minor version where less critical components have been changed may be recommended if the offline NMS deployment 104A is used in a sensitive business area (e.g., air transportation, healthcare, enterprise business, etc.). Examples of less critical components include databases, infrastructure, system software, and the like.

Any combination of the previously described version characteristics may be utilized. For example, the local stability scores of the available minor versions may be calculated by calculating a weighted sum of one or more of: normalized stability characteristics, normalized location characteristics, normalized system characteristics, normalized device characteristics, and normalized network characteristics. The weights may be determined by ordinal regression. In an implementation, the weights are previously determined by an ordinal regression algorithm, which may be implemented with an ordinal regression model. The ordinal regression model is a machine learning model that includes one or more neural network(s) trained to automatically calculate the weights for the weighted sum algorithm. The ordinal regression model may have been previously trained using a deep learning process with a set of training data. For example, an administrator may assign relative local stability scores to minor versions of training data. The ordinal regression model may then be used to calculate the weights from the training data based on the assign local stability scores. Those weights may be stored, and then subsequently be used by the weighted sum algorithm to calculate the local stability scores of the available minor versions.

The control server 108A performs a step 414 of selecting the minor version that has the highest local stability score. The available minor versions may be ranked with ascending local stability scores. The available minor version at the top of that ranking may then be selected. The minor version with the highest local stability score is the minor version that is predicted to be most suitable for the offline NMS deployment 104A, and is the recommended minor version.

FIG. 5 is a diagram of a forced package upgrade method 500, according to some implementations. The forced package upgrade method 500 will be described in conjunction with FIG. 1. The forced package upgrade method 500 may be performed by a control server 108A of an offline NMS deployment 104A when forcing an upgrade of the offline NMS deployment 104A.

The control server 108A performs a step 502 of receiving a package upgrade record, the package upgrade record comprising metadata about minor versions of a target major version of a software package for a NMS deployment, the metadata comprising online stability scores and changes of the minor versions. This may include similar steps as previously described for step 302 (see FIG. 3).

The control server 108A performs a step 504 of recommending one of the minor versions of the target major version based on the online stability scores and the changes of the minor versions. This may include similar steps as previously described for step 316 (see FIG. 3). For example, this may include calculating local stability scores for the minor versions, and selecting a minor version of the minor versions with a highest one of the local stability scores. The local stability scores for the minor versions may be calculated by evaluating stability characteristics of the minor versions, location characteristics of the NMS deployment, system characteristics of the NMS deployment, device characteristics of the NMS deployment, and/or network characteristics of the NMS deployment.

The control server 108A performs a step 506 of receiving a selection of a selected minor version of the minor versions. This may include similar steps as previously described for step 318 (see FIG. 3).

The control server 108A performs a step 508 of enabling a forced upgrade notification for the selected minor version of the target major version of the software package. This may include similar steps as previously described for step 320 (see FIG. 3).

Figure 6:
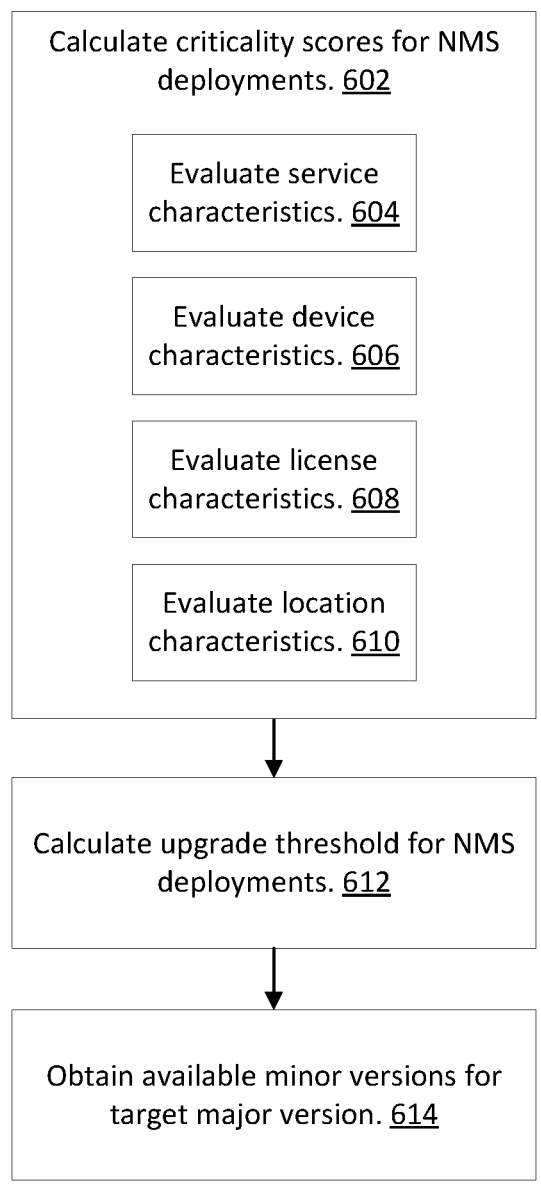
FIG. 6 is a diagram of a package upgrade record generation method, according to some implementations.

FIG. 6 is a diagram of a package upgrade record generation method 600, according to some implementations. The package upgrade record generation method 600 will be described in conjunction with FIG. 1. The package upgrade record generation method 600 may be performed by an update server 118 when generating package upgrade records for multiple NMS deployments 104.

The update server 118 performs a step 602 of calculating criticality scores for the NMS deployments 104. An NMS deployment 104 is operated by a customer of the cloud provider, and the criticality score for an NMS deployment 104 is a number that is proportional to the importance of that customer to the cloud provider. An NMS deployment 104 having a large criticality score indicates the corresponding customer is an important customer. For example, an NMS deployment 104 for a hospital may have a higher criticality score than an NMS deployment 104 for a retailer.

The criticality scores are calculated by evaluating deployment characteristics of the NMS deployments 104. The deployment characteristics include metadata that describes the operational footprints of the NMS deployments 104. In an implementation, the deployment characteristics include service characteristics of the NMS deployments 104, device characteristics of the NMS deployments 104, license characteristics of the NMS deployments 104, location characteristics of the NMS deployments 104, combinations thereof, and the like.

The deployment characteristics may be evaluated with a suitable weighted sum algorithm. The weighted sum algorithm assigns scores to the NMS deployments 104 by computing a weighted sum of the deployment characteristics. Optionally, the deployment characteristics may be normalized to a standard scaler before they are evaluated. The normalization may be by a Z-score, percentile score, mathematical variant, or the like.

In some implementations, the update server 118 performs a step 604 of evaluating service characteristics of the NMS deployments 104. The service characteristics are metadata values that represent the service level agreements of the NMS deployments 104. The NMS deployments 104 with higher service level agreements may have higher criticality scores.

In some implementations, the update server 118 performs a step 606 of evaluating device characteristics of the NMS deployments 104. The device characteristics are metadata values that represent the total number of network devices of the NMS deployments 104. The NMS deployments 104 with higher numbers of network devices may have higher criticality scores.

In some implementations, the update server 118 performs a step 608 of evaluating license characteristics of the NMS deployments 104. The license characteristics are metadata values that represent the total number of active licenses for the NMS deployments 104. The NMS deployments 104 with higher numbers of active licenses may have higher criticality scores.

In some implementations, the update server 118 performs a step 610 of evaluating location characteristics of the NMS deployments 104. The location characteristics are metadata values that represent the geographic locations of the NMS deployments 104. The NMS deployments 104 in particular geographic locations may have higher criticality scores.

Any combination of the previously described deployment characteristics may be utilized. For example, the criticality scores of the NMS deployments 104 may be calculated by calculating a weighted sum of one or more of: normalized service characteristics, normalized device characteristics, normalized license characteristics, and normalized location characteristics. The weights may be determined by ordinal regression. In an implementation, the weights are previously determined by an ordinal regression algorithm, which may be implemented with an ordinal regression model. The ordinal regression model is a machine learning model that includes one or more neural network(s) trained to automatically calculate the weights for the weighted sum algorithm. The ordinal regression model may have been previously trained using a deep learning process with a set of training data. For example, an administrator may assign relative criticality scores to NMS deployments of training data. The ordinal regression model may then be used to calculate the weights from the training data based on the assign criticality scores. Those weights may be stored, and then subsequently be used by the weighted sum algorithm to calculate the criticality scores of the NMS deployments 104.

The update server 118 performs a step 612 of calculating an upgrade threshold. The upgrade threshold is calculated based on a desired timeline on which forced upgrades should be rolled out to the NMS deployments 104. For example, the upgrade threshold may initially be a low value, so that only NMS deployments 104 with lower criticality scores are forced to upgrade. Subsequently, the upgrade threshold may be increased, so that NMS deployments 104 with progressively higher criticality scores are forced to upgrade. Eventually, the upgrade threshold is high enough that all NMS deployments 104 are forced to upgrade to a target major version of the software package.

The update server 118 performs a step 614 of obtaining available minor versions for the target major version of the software package. Metadata about the available minor versions may be assembled, such as by analyzing the release notes for each minor version. Additionally, the online stability score for each minor version may be calculated.

Subsequently, the update server 118 generates a package upgrade record for each NMS deployment 104. The package upgrade record for an NMS deployment 104 includes the upgrade threshold, the metadata about the available minor versions, and (optionally) the criticality score of that NMS deployment 104. The package upgrade record may be stored on the upgrade repository 114. Package upgrade records may be generated regularly for each NMS deployment 104. As previously described, an NMS deployment 104 will require a new package upgrade record be regularly provided to the NMS deployment 104.

The foregoing outlines features of several examples so that those skilled in the art may better understand the aspects of the present disclosure. Various modifications and combinations of the illustrative examples, as well as other examples, will be apparent to persons skilled in the art upon reference to the description. It is therefore intended that the appended claims encompass any such modifications.

What is claimed is:

1. A system comprising:
   an update server configured to generate a package upgrade record; and
   a network management system deployment comprising a control server, the network management system deployment airgapped from the update server, the control server configured to:
      determine whether the package upgrade record has been provided to the control server, the package upgrade record comprising metadata about a target major version of a software package for the network management system deployment;
      deny access to a user interface of the control server in response to the package upgrade record not having been provided to the control server within an upgrade check window;
      permit access to the user interface of the control server in response to the package upgrade record having been provided to the control server; and
      version by:
         recommending a recommended minor version of the target major version;
         receiving a selection of a selected minor version of the target major version; and
         enabling a forced upgrade notification for the selected minor version of the target major version of the software package.

2. The system of claim 1, wherein the package upgrade record further comprises an upgrade threshold, and the control server forces the network management system deployment to upgrade the software package to the target major version in response to a criticality score for the network management system deployment being less than the upgrade threshold.

3. The system of claim 2, wherein the package upgrade record further comprises the criticality score for the network management system deployment.

4. The system of claim 2, wherein the criticality score for the network management system deployment is stored at the update server.

5. The system of claim 1, wherein the control server forces the network management system deployment to upgrade the software package to the target major version in response to the target major version being mismatched with a current major version of the software package for the network management system deployment.

6. The system of claim 1, wherein the control server is further configured to:
   determine an upgrade watch timer has expired, wherein the control server determines whether the package upgrade record has been provided to the control server in response to the upgrade watch timer expiring.

7. The system of claim 1, wherein the package upgrade record further comprises metadata about minor versions of the target major version, the metadata comprising online stability scores and changes of the minor versions, the recommended minor version being recommended based on the online stability scores and the changes of the minor versions.

8. A method, implemented by a control server of a network management system deployment, the method comprising:
   determining whether a package upgrade record has been provided to the control server, the package upgrade record comprising metadata about a target major version of a software package for the network management system deployment;
   denying access to a user interface of the control server in response to the package upgrade record not having been provided to the control server;
   permitting access to the user interface of the control server in response to the package upgrade record having been provided to the control server; and
   forcing the network management system deployment to upgrade the software package to the target major version by:
      recommending a recommended minor version of the target major version;
      receiving a selection of a selected minor version of the target major version; and
      enabling a forced upgrade notification for the selected minor version of the target major version of the software package.

9. The method of claim 8, wherein the package upgrade record further comprises an upgrade threshold and a criticality score for the network management system deployment, and the network management system deployment is forced to upgrade the software package to the target major version in response to the criticality score being less than the upgrade threshold.

10. The method of claim 8, wherein the network management system deployment is forced to upgrade the software package to the target major version in response to the target major version being mismatched with a current major version of the software package for the network management system deployment.

11. The method of claim 8, wherein the package upgrade record further comprises metadata about minor versions of the target major version, the metadata comprising online stability scores and changes of the minor versions, the recommended minor version being recommended based on the online stability scores and the changes of the minor versions.

12. The method of claim 11, wherein recommending the recommended minor version of the target major version comprises:
  calculating local stability scores for the minor versions; and
  selecting one of the minor versions with a highest one of the local stability scores.

13. The method of claim 12, wherein the local stability scores for the minor versions are calculated by evaluating stability characteristics of the minor versions, location characteristics of the network management system deployment, system characteristics of the network management system deployment, device characteristics of the network management system deployment, and network characteristics of the network management system deployment.

14. A control server comprising:
  a processor; and
  a non-transitory computer readable medium storing instructions which, when executed by the processor, cause the processor to:
    receive a package upgrade record, the package upgrade record comprising metadata about minor versions of a target major version of a software package for a network management system deployment, the metadata comprising online stability scores and changes of the minor versions;
    recommend one of the minor versions of the target major version based on the online stability scores and the changes of the minor versions;
    receive a selection of a selected minor version of the minor versions; and
    enable a forced upgrade notification for the selected minor version of the target major version of the software package.

15. The control server of claim 14, wherein the instructions to recommend one of the minor versions comprise instructions to:
  calculate local stability scores for the minor versions; and
  select a minor version of the minor versions with a highest one of the local stability scores.

16. The control server of claim 15, wherein the local stability scores for the minor versions are calculated by evaluating stability characteristics of the minor versions.

17. The control server of claim 15, wherein the local stability scores for the minor versions are calculated by evaluating location characteristics of the network management system deployment.

18. The control server of claim 15, wherein the local stability scores for the minor versions are calculated by evaluating system characteristics of the network management system deployment.

19. The control server of claim 15, wherein the local stability scores for the minor versions are calculated by evaluating device characteristics of the network management system deployment.

20. The control server of claim 15, wherein the local stability scores for the minor versions are calculated by evaluating network characteristics of the network management system deployment.

\* \* \* \* \*